(12) United States Patent
Noh

(10) Patent No.: US 7,842,422 B2
(45) Date of Patent: Nov. 30, 2010

(54) MEMBRANE-ELECTRODE ASSEMBLY FOR FUEL CELL AND FUEL CELL COMPRISING THE SAME

(75) Inventor: Hyung-Gon Noh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1560 days.

(21) Appl. No.: 11/154,059

(22) Filed: Jun. 15, 2005

(65) Prior Publication Data

US 2006/0083958 A1    Apr. 20, 2006

(30) Foreign Application Priority Data

Jun. 30, 2004    (KR) ................ 10-2004-0050745

(51) Int. Cl.
  *H01M 8/00* (2006.01)
  *H01M 2/14* (2006.01)
  *H01M 8/10* (2006.01)
(52) U.S. Cl. .............. 429/400; 429/129; 429/483; 429/492
(58) Field of Classification Search ............ 429/12, 429/129
    See application file for complete search history.

(56) References Cited

U.S. PATENT DOCUMENTS

| 5,589,565 A | * | 12/1996 | Wudl et al. | 528/205 |
| 6,716,548 B1 | * | 4/2004 | Kaliaguine et al. | 429/33 |
| 6,946,211 B1 | * | 9/2005 | Bjerrum et al. | 429/33 |
| 2006/0057451 A1 | * | 3/2006 | Okuzaki et al. | 429/42 |

FOREIGN PATENT DOCUMENTS

JP   2002-289222   10/2002
WO   WO 03/060012 A1   7/2003

* cited by examiner

*Primary Examiner*—Patrick Ryan
*Assistant Examiner*—Karie O'Neill Apicella
(74) *Attorney, Agent, or Firm*—Christie, Parker & Hale, LLP

(57) ABSTRACT

A polymer membrane-electrode assembly for a fuel cell includes an anode and a cathode, each of the anode and the cathode including a catalyst layer and an electrode substrate; and a polymer membrane placed between the anode and cathode. In the polymer membrane-electrode assembly, the polymer membrane is a polyphenylene vinylene-based polymer having a proton conductive functional group in a side chain of the polyphenylene vinylene-based polymer.

25 Claims, 3 Drawing Sheets

MEMBRANE-ELECTRODE ASSEMBLY FOR FUEL CELL AND FUEL CELL COMPRISING THE SAME

CROSS REFERENCE TO RELATED APPLICATION

This application claims priority to and the benefit of Korean Patent Application No. 10-2004-0050745 filed in the Korean Intellectual Property Office on Jun. 30, 2004, the entire content of which is incorporated hereinto by reference.

FIELD OF THE INVENTION

The present invention relates to a membrane-electrode assembly and a fuel cell having the same, and, more particularly, to a membrane-electrode assembly, which is stable at a high temperature, has excellent proton conductivity or permeability so that the membrane-electrode assembly can be operated at a high temperature without humidifying, and has superb mechanical strength, and a fuel cell having the same.

BACKGROUND OF THE INVENTION

A fuel cell is an electric power generation system for producing electrical energy through a chemical reaction between oxidant and hydrogen or a hydrocarbon-based material such as methanol, ethanol, or natural gas.

A fuel cell can be classified into a phosphoric acid type, a molten carbonate type, a solid oxide type, a polymer electrolyte type, or an alkaline type depending upon the kind of electrolyte used. Although each of these different type of fuel cells operates in accordance with the same basic principles, they may differ from one another in the kind of fuel, the operating temperature, the catalyst, and the electrolyte used.

Recently, a polymer electrolyte membrane fuel cell (PEMFC) has been developed. The PEMFC has power characteristics that are superior to those of conventional fuel cells, as well as a lower operating temperature and faster start and response characteristics. Because of this, the PEMFC can be applied to a wide range of applications such as for portable electrical power sources for automobiles, distributed power sources for houses and public buildings, and small electrical power sources for electronic devices.

A PEMFC is essentially composed of a stack, a reformer, a fuel tank, and a fuel pump. The stack forms a body of the PEMFC, and the fuel pump provides the fuel stored in the fuel tank to the reformer. The reformer reforms the fuel to generate the hydrogen gas and supplies the hydrogen gas to the stack. Fuel stored in the fuel tank is pumped to the reformer using power which can be provided by the PEMFC. Then, the reformer reforms the fuel to generate the hydrogen gas which is electrochemically reacted with oxidant in the stack to generate the electrical energy.

Alternatively, a fuel cell may include a direct oxidation fuel cell (DOFC) in which a liquid methanol fuel is directly introduced to the stack. Unlike a PEMFC, a DOFC does not require a reformer.

In the above-mentioned fuel cell system, the stack for generating the electricity has a structure in which several unit cells, each having a membrane-electrode assembly (MEA) and a separator (referred to also as "bipolar plate"), are stacked adjacent to one another. The MEA is composed of an anode (referred to also as "fuel electrode" or "oxidation electrode") and a cathode (referred to also as "air electrode" or "reduction electrode") separated by a polymer electrolyte membrane.

FIG. 1 is a diagram showing an operation of a fuel cell 1. The fuel cell 1 includes an anode 3, a cathode 5, and a polymer electrolyte membrane 7. As shown, when hydrogen gas or fuel is supplied to the anode 3, an electrochemical oxidation reaction occurs and hydrogen is ionized to thereby produce protons $H^+$ and electrons $e^-$. The protons $H^+$ move to the cathode 5 through the polymer electrolyte membrane 7 and the electrons $e^-$ move to the cathode 5 through an external circuit (not shown). The protons $H^+$ in the cathode 5 electrochemically react with an oxidant such as oxygen or air supplied to the cathode 5 to thereby produce reaction heat and water, and the movement of the electrons $e^-$ through the external circuit produces electrical energy. The electrochemical reactions in the fuel cell 1 can be expressed as follows.

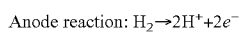

Anode reaction: $H_2 \rightarrow 2H^+ + 2e^-$

Cathode reaction: $2H^+ + 1/2 O_2 + 2e^- \rightarrow H_2O$

A polymer membrane-electrode assembly is composed of a solid polymer electrolyte membrane (e.g., the membrane 7 of FIG. 1) and an electrode layer including catalysts supported on carbon. The polymer electrolyte membrane can be fabricated using a perfluorosulfonic acid ionomer membrane such as Nafion® (by DuPont), Flemion® (by Asahi Glass), Asiplex® (by Asahi Chemical), or Dow XUS® (by Dow Chemical). The electrode layer including the catalysts supported on the carbon can be fabricated by binding the electrode substrates such as a porous carbon paper or a carbon cloth with a carbon powder carrying a pulverized catalyst particle such as platinum (Pt) or ruthenium (Ru) using a waterproof binder.

Conventional polymer electrolyte membranes (referred to also as "polymer membranes") such as Nafion® have good proton conductivity (or permeability), good chemical-resistance, and good anti-corrosiveness. However, they are expensive, and may allow methanol to crossover. Also, since the movement of $H^+$ or protons through the conventional polymer membranes requires water, a humidifier needs to be used. Therefore, a setup cost for a fuel cell using a conventional polymer membrane is high and a large setup space is also required. In addition, when the fuel cell is operated at a high temperature, the moisture is evaporated and thus the proton conductivity of the conventional polymer membrane is degraded.

SUMMARY OF THE INVENTION

An embodiment of the present invention provides an improved polymer membrane-electrode assembly for a fuel cell. The improved polymer membrane-electrode assembly is stable at a high temperature, has excellent proton conductivity so that the polymer membrane-electrode assembly can be operated without additional moisture at a high temperature, and has a superb mechanical hardness.

Another embodiment of the present invention provides a fuel cell having the improved polymer membrane-electrode assembly.

One embodiment of the present invention provides a membrane-electrode assembly for a fuel cell. The membrane-electrode assembly includes: an anode and a cathode, each of the anode and the cathode including a catalyst layer and an electrode substrate; and a polymer membrane between the anode and cathode. In the membrane-electrode assembly, the polymer membrane includes a polyphenylene vinylene-based polymer having a proton conductive functional group in a side chain of the polyphenylene vinylene-based polymer.

One embodiment of the present invention also provides a fuel cell including the above described membrane-electrode assembly and a separator being positioned on either side of the membrane-electrode assembly.

DETAILED DESCRIPTION

Figure 1:
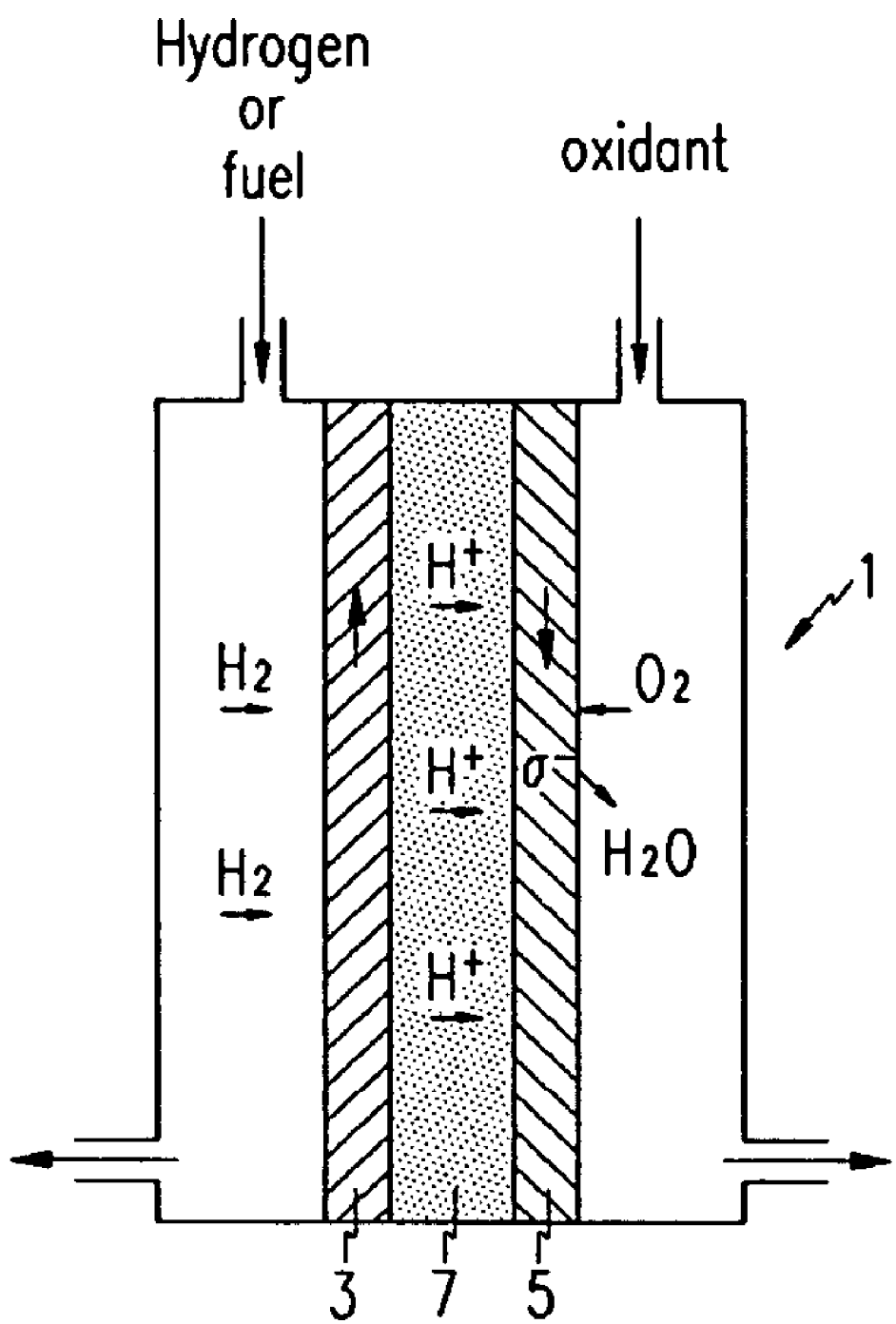
FIG. 1 is a schematic diagram showing an operation of a fuel cell having a polymer membrane.

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

The present invention provides a polymer membrane-electrode assembly for a fuel cell which is stable at a high temperature and has excellent proton conductivity or permeability so that the fuel cell can be operated at a high temperature without humidifying (without needing a humidifier). As a result, the polymer membrane-electrode assembly eliminates the cost associated with setting up a humidifier and has a space saving effect.

The polymer membrane-electrode assembly for the fuel cell includes anode and cathode electrodes, each of which includes a catalyst layer on an electrode substrate, and a polymer membrane placed between the anode and cathode electrodes. The polymer membrane is formed of a polyphenylene vinylene-based polymer having a proton conductive functional group in a side chain of the polyphenylene vinylene-based polymer.

The polyphenylene vinylene-based polymer, which is used as a polymer membrane in the present invention, is stable at a high temperature and has strong mechanical strength because it has a main chain of polyphenylene vinylene. Proton conductivity of the polymer membrane is provided by introducing a proton conductive functional group to a side chain of the polyphenylene vinylene-based polymer. Preferably, the side chain is ether or alkylene, more preferably ether or alkylene having from 1 to 10 carbon atoms. Preferably, the proton conductive functional group includes O, S, N, or P. Suitable functional groups include a sulfonic acid group ($SO_3H$), a carboxyl group (COOH), a hydroxyl group, a phosphoric acid group, and the like. The proton conductive functional group is ionized, and the ionized proton conductive functional group has proton conductivity.

The polyphenylene vinylene-based polymer with the proton conductive functional group can be represented by the following Formula 1 below.

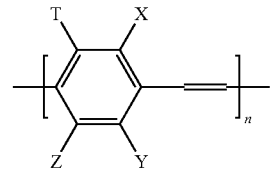

Formula 1

In Formula 1, at least one of X, Y, Z, and T is a proton conductive functional group and any remaining of X, Y, Z and T are hydrogen. Also, in Formula 1, n is such that the weight average molecular weight of the polymer is from 10,000 to 3,000,000, and more preferably, from 10,000 to 2,000,000.

The polyphenylene vinylene-based polymer can form a polymer membrane by blending it with an ion conductive polymer. Preferably, the ion conductive polymer is one with high ion conductivity and low temperature-dependency, such as perfluorosulfonic acid polymer, polybenzimidazole including poly(2,2'-(m-phenylene)-5,5'-bibenzimidazole), and poly(2,5-benzimidazole), polyimide, polyphenyleneoxide, polyetherketone, and polyphosphazene. In consideration of the ion conductivity and strength of the polymer membrane, it is preferable that the ion conductive polymer is used in an amount from 0.01 to 98 parts by weight with respect to 100 parts by weight of the polyphenylene vinylene-based polymer. That is, when the content of the ion conductive polymer is less than 0.01 part by weight, the ion conductivity improvement effect is insignificant. Alternatively, when the content is more than 98 parts by weight, the function of the polyphenylene vinylene-based polymer may not appear, because there may not be enough polyphenylene vinylene-based polymer.

Also, in an embodiment of the present invention, a polymer membrane can be prepared in the form of a composite by blending the polyphenylene vinylene-based polymer with at least one additive selected from the group consisting of an inorganic filler and a nano-sized powder. The composite polymer membrane of this embodiment can suppress methanol crossover. The inorganic filler can be silica and/or alumina. The nano-sized powder can be particles of a nano size, that are, for example, 100 nanometers in length, such as fumed silica (dried silica). Preferably, the additive is between 0.01 and 50 wt % with respect to the polymer membrane. That is, when the content of the additive is less than 0.01 wt %, the addition effect is insignificant, and when the content is more than 50 wt %, the function of the polyphenylene vinylene-based polymer may not appear.

The polyphenylene vinylene-based polymer can be doped with phosphoric acid ($H_3PO_4$) or sulfuric acid ($H_2SO_4$) to improve the ion conductivity. Preferably, the doping quantity is between 0.001 and 90 wt % with respect to the polymer membrane.

Figure 2:
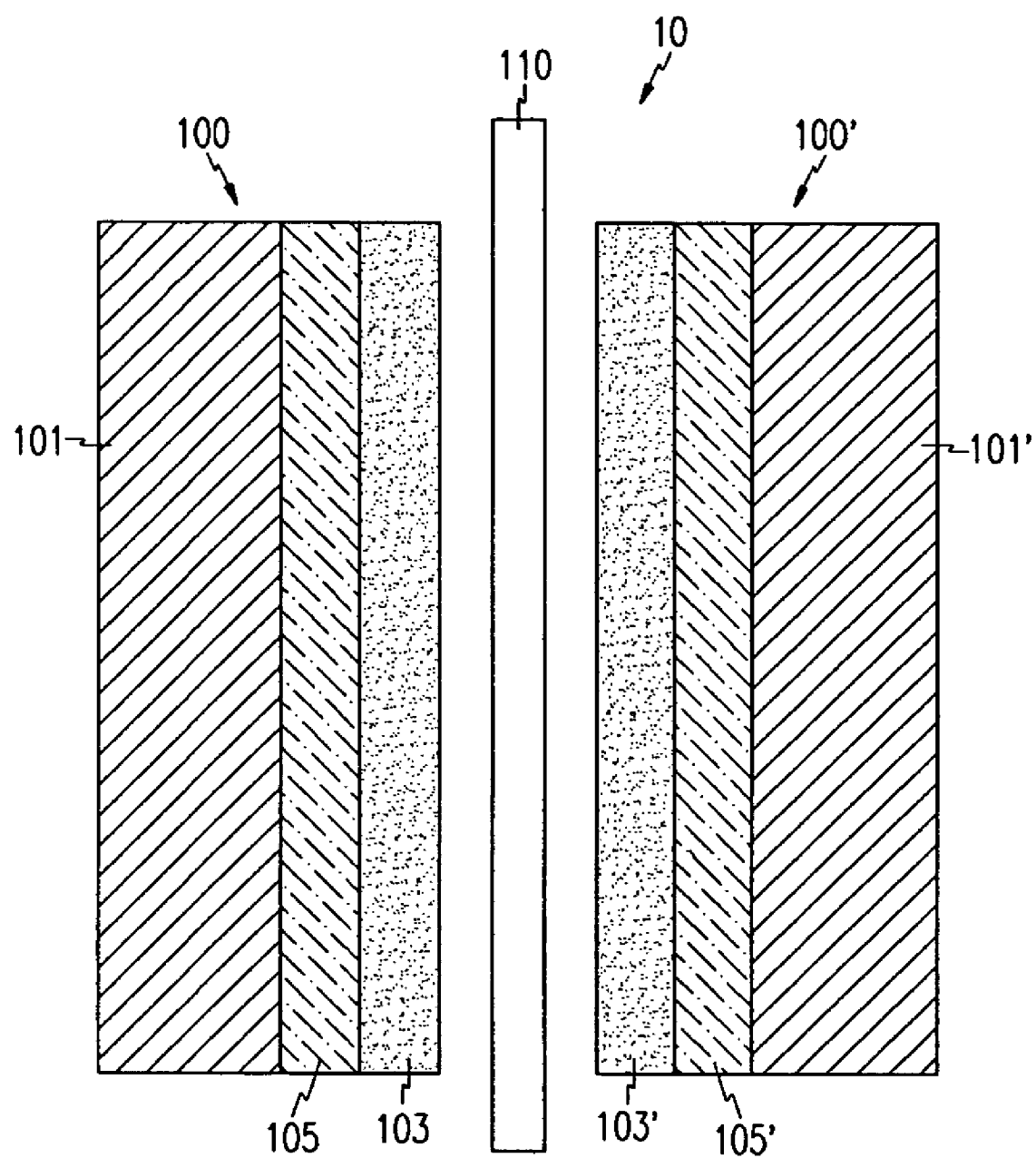
FIG. 2 is a cross-sectional view showing a membrane-electrode assembly having a polymer membrane according to an exemplary embodiment of the present invention.

A membrane-electrode assembly 10 is formed by placing the polyphenylene vinylene-based polymer membrane 110 between a cathode 100' and an anode 100 in a fuel cell. A cross section of the membrane-electrode assembly 10 is presented in FIG. 2. As shown, the membrane-electrode assembly 10 includes the polymer membrane 110. The polymer membrane 110 is placed between the anode 100 and the cathode 100'.

The anode 100 and the cathode 110' include electrode substrates 101 and 101' and catalyst layers 103 and 103', respectively.

As for the electrode substrate 101 and 101', carbon paper, carbon cloth, or carbon felt can be used, and they can be treated with polytetrafluoroethylene (PTFE) to be water-repellent. The electrode substrates 101 and 101' can function both as gas diffusion layers (GDLs) for diffusing reaction gas to the polymer membrane-electrode assembly 10 as well as support layers for supporting the polymer membrane-electrode assembly 10.

The catalyst layers 103 and 103' are coated with a metal catalyst to facilitate a related reaction, i.e., oxidation of hydrogen and reduction of oxidant. As for the metal catalyst, it is preferable to use platinum, ruthenium, osmium, or platinum-transition metals, where suitable transition metal include, but are not limited to, ruthenium, osmium, chrome, copper, and nickel. Preferably, the metal catalyst is supported by a carrier. As for the carrier, carbon materials such as acetylene black and graphite, and inorganic fine particles such as alumina and silica, can be used. In the case where a noble metal supported on a carrier is used as the catalyst, a commercially available one can be used or the catalyst can be prepared by supporting a noble metal on a carrier. The coating process may be performed using wet coating or dry coating.

The membrane-electrode assembly 10 for the fuel cell can further include microporous layers 105 and 105' to improve the gas diffusion effect between the electrode substrates 101 and 101' and the catalyst layers 103 and 103', respectively. The microporous layers 105 and 105' uniformly supply reaction gas to the catalyst layers 103 and 103', and transfer electrons formed in the catalyst layers 103 and 103' to the electrode substrates 101 and 101', respectively. Typically, the microporous layers 105 and 105' include a conductive powder having a small particle size, for instance, carbon powder, carbon black, acetylene black, active carbon, fullerene (C60), carbon nanotube, carbon nano horn, and carbon nano ring.

The membrane-electrode assembly 10 is inserted between separators (not shown). Each of the separators has a gas flow channel and a cooling channel to thereby form a unit cell. Multiple unit cells are stacked adjacent to one another to form a stack, and a fuel cell is prepared by inserting the stack between two end plates. These and other components of the fuel cell can be prepared by any suitable techniques known to those skilled in the art. The membrane-electrode assembly 10 of FIG. 2 may be included in any fuel cell such as low temperature humidifying type, low temperature non-humidifying type, high temperature humidifying type, and high temperature non-humidifying type fuel cells.

The following examples further illustrate the present invention in more detail, but the present invention is not limited by these examples.

Example 1

A membrane-electrode assembly was prepared by (1) using a film of polyphenylene vinylene polymer, which is shown in Formula 2 below, as a polymer membrane, (2) placing carbon paper having a platinum catalyst layer on both sides of the polymer membrane, and (3) applying pressure thereto.

To fabricate a unit cell, the prepared membrane/electrode assembly was inserted between two sheets of gaskets, then inserted between two separators with a predetermined-shaped gas flow channel and a cooling channel, then inserted between two copper end plates, and then compressed between the two copper end plates.

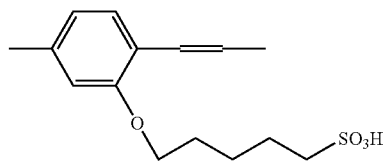

Formula 2

Example 2

A unit cell was fabricated by substantially the same method as in Example 1, except that the polymer membrane was prepared by (1) mixing the polyphenylene vinylene polymer of Formula 2 with silica in a weight ratio of 100:10 and (2) forming the mixture into a film.

Example 3

A unit cell was fabricated by substantially the same method as in Example 1, except that the polymer membrane was prepared by (1) mixing the polyphenylene vinylene polymer of Formula 2 with Nafion® 112 polymer (a product of the DuPont company) in a weight ratio of 100:95 and (2) forming the mixture into a film.

Comparative Example 1

A unit cell was fabricated by substantially the same method as in Example 1, except that a poly(perfluorosulfonic acid) electrolyte membrane (Nafion®, of the DuPont company) was used as the polymer membrane for a fuel cell.

Figure 3:
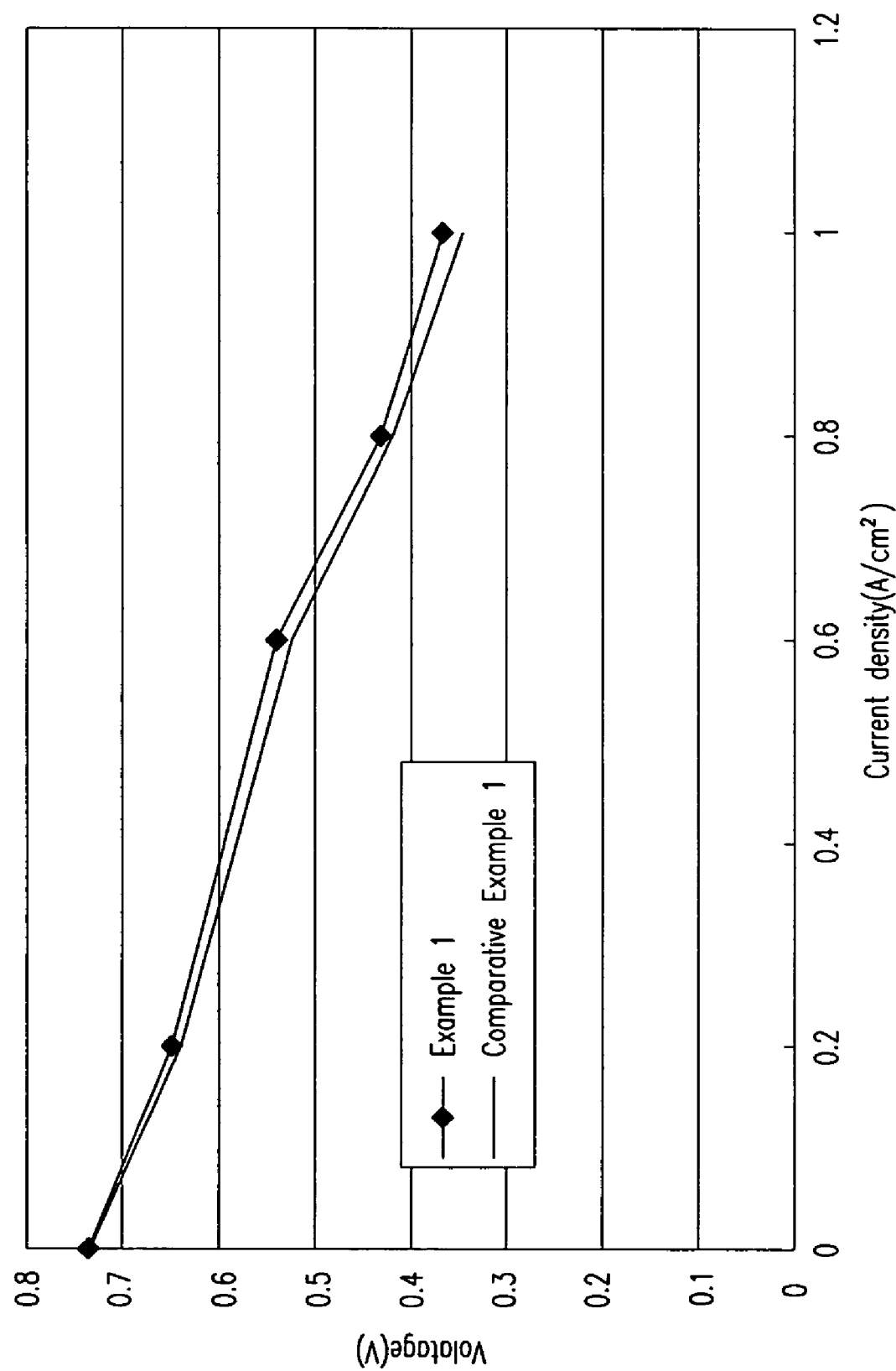
FIG. 3 is a graph illustrating voltage and current density characteristics of a unit cell in accordance with Example 1 of the present invention and Comparative Example 1.

Hydrogen gas was then supplied to the unit cells of Example 1 and Comparative Example 1 at a normal atmosphere at 60° C., and the current density and the voltage thereof were measured. The results are presented in FIG. 3. As shown, the current density and voltage characteristics of Example 1 are higher or superior to those of Comparative Example 1.

In view of the foregoing, a membrane-electrode assembly for a fuel cell of the present invention is stable at a high temperature and has excellent proton conductivity so that the fuel cell can be operated at a high temperature without requiring water. Because of this, the fuel cell or the membrane-electrode assembly does not require a humidifier and the cost and the space for setting up the humidifier can be saved.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A membrane-electrode assembly for a fuel cell, comprising:
    an anode and a cathode, each of the anode and the cathode including a catalyst layer and an electrode substrate; and
    a polymer membrane between the anode and cathode,
    wherein the polymer membrane comprises a polyphenylene vinylene-based polymer having the following chemical formula:

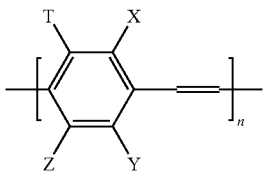

wherein only one of X, Y, Z, and T is a proton conductive functional group and the remaining of X, Y, Z, and T are hydrogen.

2. The membrane-electrode assembly of claim 1, wherein the proton conductive functional group is in a side chain comprising a chain selected from the group consisting of alkylene, ether, and combinations thereof.

3. The membrane-electrode assembly of claim 1, wherein the proton conductive functional group comprises a chemical element selected from the group consisting of O, S, N, P, and combinations thereof.

4. The membrane-electrode assembly of claim 3, wherein the proton conductive functional group is selected from the group consisting of a sulfonic acid group ($SO_3H$), a carboxyl group (COOH), a hydroxyl group, a phosphoric acid group, and combinations thereof.

5. The membrane-electrode assembly of claim 1, wherein the polymer membrane is prepared by blending the polyphenylene vinylene-based polymer with an ion conductive polymer.

6. The membrane-electrode assembly of claim 5, wherein the ion conductive polymer is selected from the group consisting of perfluorosulfonic acid polymer, polybenzimidazole, polyimide, polyphenyleneoxide, polyetherketone, polyphosphazene, and combinations thereof.

7. The membrane-electrode assembly of claim 5, wherein the ion conductive polymer is from 0.01 to 98 parts by weight with respect to 100 parts by weight of the polyphenylene vinylene-based polymer.

8. The membrane-electrode assembly of claim 1, wherein the polymer membrane comprises the polyphenylene vinylene-based polymer and at least one additive selected from the group consisting of an inorganic filler and a nano-sized powder.

9. The membrane-electrode assembly of claim 8, wherein the additive is from 0.01 to 50 wt % with respect to the polymer membrane.

10. The membrane-electrode assembly of claim 1, wherein the catalyst layer comprises a material selected from the group consisting of platinum, ruthenium, osmium, platinum-transition metal alloys, and combinations thereof.

11. The membrane-electrode assembly of claim 10, wherein the transition metal is selected from the group consisting of ruthenium, osmium, chrome, copper, nickel, and combinations thereof.

12. The membrane-electrode assembly of claim 1, further comprising a microporous layer between the catalyst layer and the electrode substrate.

13. The membrane-electrode assembly of claim 1, wherein at least a part of the polyphenylene vinylene-based polymer has the following chemical formula:

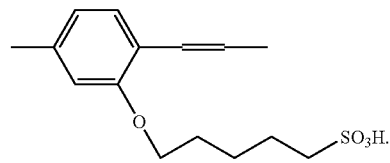

14. A fuel cell, comprising:
a membrane-electrode assembly including an anode and a cathode, each of the anode and the cathode having a catalyst layer and an electrode substrate, and a polymer membrane placed between the anode and cathode; and
a separator being positioned on either side of the membrane-electrode assembly,
wherein the polymer membrane comprises a polyphenylene vinylene-based polymer having the following chemical formula:

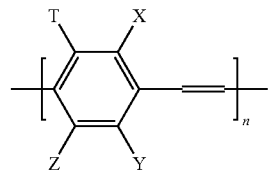

wherein only one of X, Y, Z, and T is a proton conductive functional group and the remaining of X, Y, Z, and T are hydrogen.

15. The fuel cell of claim 14, wherein the proton conductive functional group is selected from the group consisting of a sulfonic acid group ($SO_3H$), a carboxyl group (COOH), a hydroxyl group, a phosphoric acid group, and combinations thereof.

16. The fuel cell of claim 14, wherein the polymer membrane is prepared by blending the polyphenylene vinylene-based polymer with an ion conductive polymer.

17. The fuel cell of claim 16, wherein the ion conductive polymer is selected from the group consisting of perfluorosulfonic acid polymer, polybenzimidazole, polyimide, polyphenyleneoxide, polyetherketone, polyphosphazene, and combinations thereof.

18. The fuel cell of claim 16, wherein the ion conductive polymer is from 0.01 to 98 parts by weight with respect to 100 parts by weight of the polyphenylene vinylene-based polymer.

19. The fuel cell of claim 14, wherein the polymer membrane comprises the polyphenylene vinylene-based polymer and at least one additive selected from the group consisting of an inorganic filler and a nano-sized powder.

20. The fuel cell of claim 19, wherein the additive is from 0.01 to 50 wt % with respect to the polymer membrane.

21. The fuel cell of claim 14, wherein the catalyst layer comprises a material selected from the group consisting of platinum, ruthenium, osmium, platinum-transition metal alloys, and combinations thereof.

22. The fuel cell of claim 21, wherein the transition metal is selected from the group consisting of ruthenium, osmium, chrome, copper, nickel, and combinations thereof.

23. The fuel cell of claim 14, further comprising a microporous layer between the catalyst layer and the electrode substrate.

24. A polymer membrane for a membrane-electrode assembly of a fuel cell, comprising: a polyphenylene vinylene-based polymer blended with an ion conductive polymer to have a proton conductive functional group in a side chain of the polyphenylene vinylene-based polymer, wherein the polyphenylene vinylene-based polymer having the proton conductive functional group allows the polymer membrane to permeate protons at a high temperature and a low humidity, and has the following chemical formula:

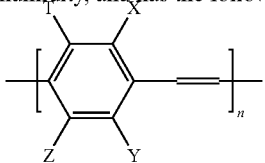

wherein only one of X, Y, Z, and T is a proton conductive functional group and the remaining of X, Y, Z, and T are hydrogen.

25. The polymer membrane of claim 24, further comprising an additive blended with the polyphenylene vinylene-based polymer to suppress methanol crossover, the additive being selected from the group consisting of an inorganic filler and a nano-sized powder.

* * * * *